United States Patent

[11] 3,631,342

[72] Inventor John C. McDonald
Los Altos, Calif.

[21] Appl. No. 6,043
[22] Filed Jan. 26, 1970
[45] Patented Dec. 28, 1971
[73] Assignee Vidar Corporation
Mountain View, Calif.
Continuation of application Ser. No. 529,460, Feb. 23, 1966, now abandoned. This application Jan. 26, 1970, Ser. No. 6,043

[54] DIGITAL VOLTMETER APPARATUS EMPLOYING A BIPOLAR AMPLIFIER HAVING A UNIDIRECTIONAL OUTPUT AND A VOLTAGE CONTROLLED OSCILLATOR
4 Claims, 6 Drawing Figs.

[52] U.S. Cl. ........................................................ 324/120, 307/261, 324/119
[51] Int. Cl. ........................................................ G01r 19/26, H03k 5/00
[50] Field of Search ............................................ 324/99, 99 D, 120, 119, 123, 132, 106; 307/230, 261, 262; 328/26; 235/197

[56] References Cited

UNITED STATES PATENTS

| | | | |
|---|---|---|---|
| 3,205,347 | 9/1965 | Wright | 324/132 X |
| 3,201,781 | 8/1965 | Holland | 324/99 X |
| 3,345,562 | 10/1967 | Rockwell | 324/119 |

OTHER REFERENCES

Walton, C. A.; Floating Input Preamplifier; IBM Tech. Dis. Bulletin; Vol. 10, No. 3; Aug., 1967, pg. 346, 347

*Primary Examiner*—Rudolph V. Rolinec
*Assistant Examiner*—Ernest F. Karlsen
*Attorney*—Flehr, Hohbach, Text, Albritton & Herbert

ABSTRACT: A voltage to frequency converter serving, for example, as a digital voltmeter which includes a bipolar amplifier responsive to both positive and negative DC inputs and also AC inputs. Coupled to the amplifier is a voltage-controlled oscillator which in combination with a counter provides an indication of the input voltage magnitude. The oscillator is responsive to a single polarity input voltage produced by the bipolar amplifier. To promote the DC stability of the amplifier a chopper amplifier converts all DC to AC which after reconversion to higher level DC is then coupled into the wide-band bipolar amplifier.

INVENTOR.
JOHN C. McDONALD
BY
Flehr and Swain
ATTORNEYS

INVENTOR.
JOHN C. McDONALD
BY
Flehr and Swain
ATTORNEYS

INVENTOR
JOHN C. McDONALD
BY [signature]
ATTORNEYS

INVENTOR
JOHN C. McDONALD
BY [signature]
ATTORNEYS

DIGITAL VOLTMETER APPARATUS EMPLOYING A BIPOLAR AMPLIFIER HAVING A UNIDIRECTIONAL OUTPUT AND A VOLTAGE CONTROLLED OSCILLATOR

This is a continuation of Ser. No. 529,460 filed Feb. 23, 1966 now abandoned.

The present invention is directed to an integrating digital voltmeter and more particularly to a digital voltmeter which is capable of automatically measuring both AC and DC voltages.

In prior art digital voltmeters there was a definite lack of a capability of easily measuring both AC and DC voltages automatically. When digital voltmeters of the type including voltage controlled oscillators were used to measure a DC voltage, there was included a phase-sensitive circuit which would selectively couple either to a positive voltage controlled oscillator portion of a negative voltage controlled oscillator portion, depending on the polarity of the DC input voltage. When an AC input signal was applied, the phase sensitive circuit introduced crossover error and could not accommodate the high-frequency AC input. When measuring AC voltages, an additional AC to DC converter was included.

It is a general object of the present invention to provide an improved digital voltmeter.

It is another object of this invention to provide an integrating digital voltmeter which is economical in construction.

It is yet another object of this invention to provide a digital voltmeter which responds to different polarities of input voltages without resort to expensive and complex circuitry.

It is still another object of the invention to provide a voltmeter of the above type which measures either AC or DC voltages.

In accordance with the above objects, the invention generally comprises a bipolar amplifier means responsive to both positive and negative polarity DC input signals and AC signals to produce an amplified unidirectional output voltage of a single polarity. This single polarity voltage is then coupled to a voltage controlled oscillator which has an output signal whose frequency is proportional to the instantaneous magnitude of the input voltage. Counter means are coupled to the voltage-controlled oscillator for producing a digital indication of the frequency output signal of the oscillator to give the magnitude of the input signal.

Referring now to the drawings.

Figures 1, 2, 3:
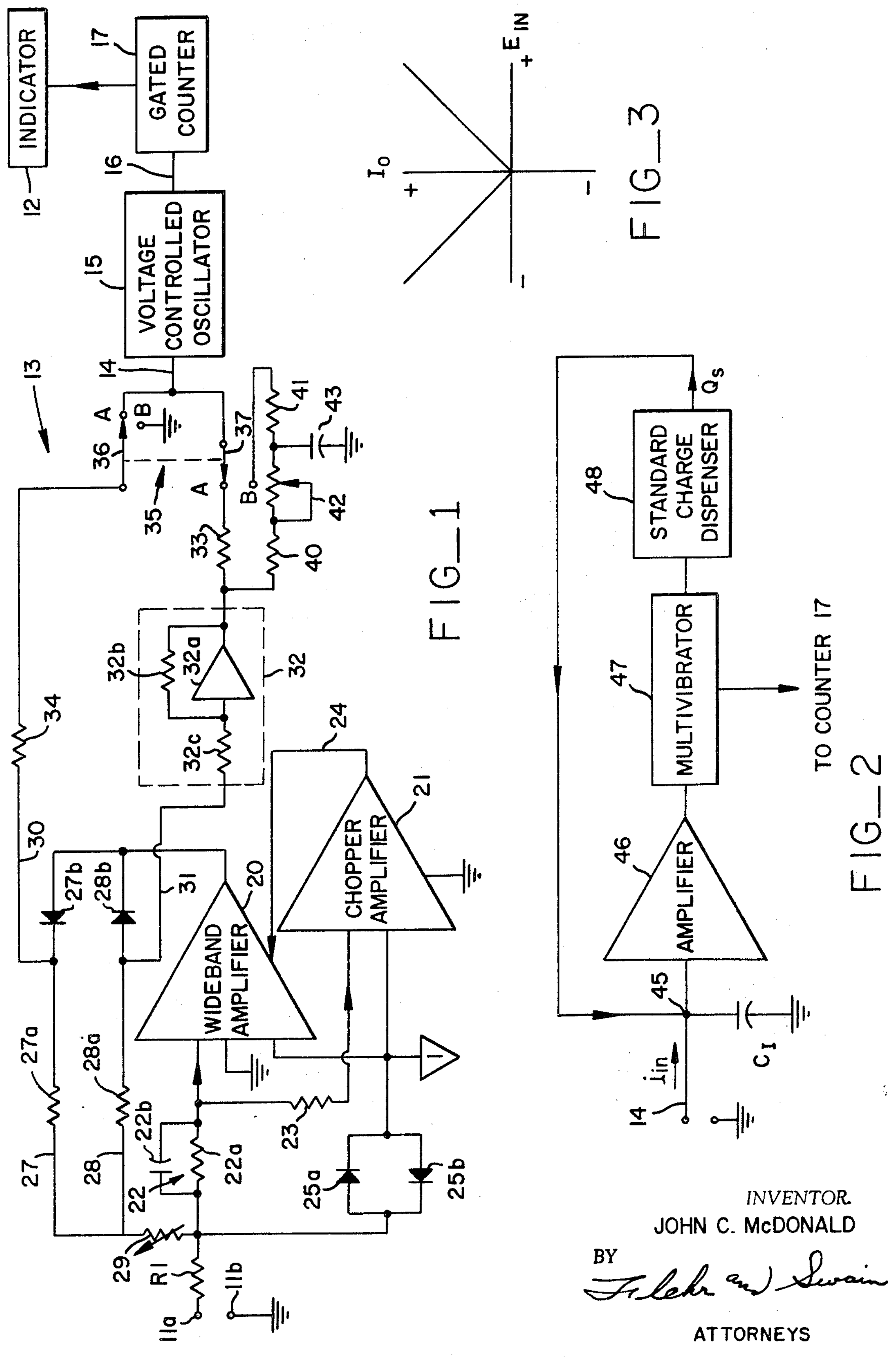
FIG. 1 is a schematic circuit diagram of a digital voltmeter embodying the present invention.
FIG. 2 is a schematic circuit diagram showing in greater detail a portion of FIG. 1.
FIG. 3 is a graph useful in explaining the operation of FIG. 1.
Figure 4:
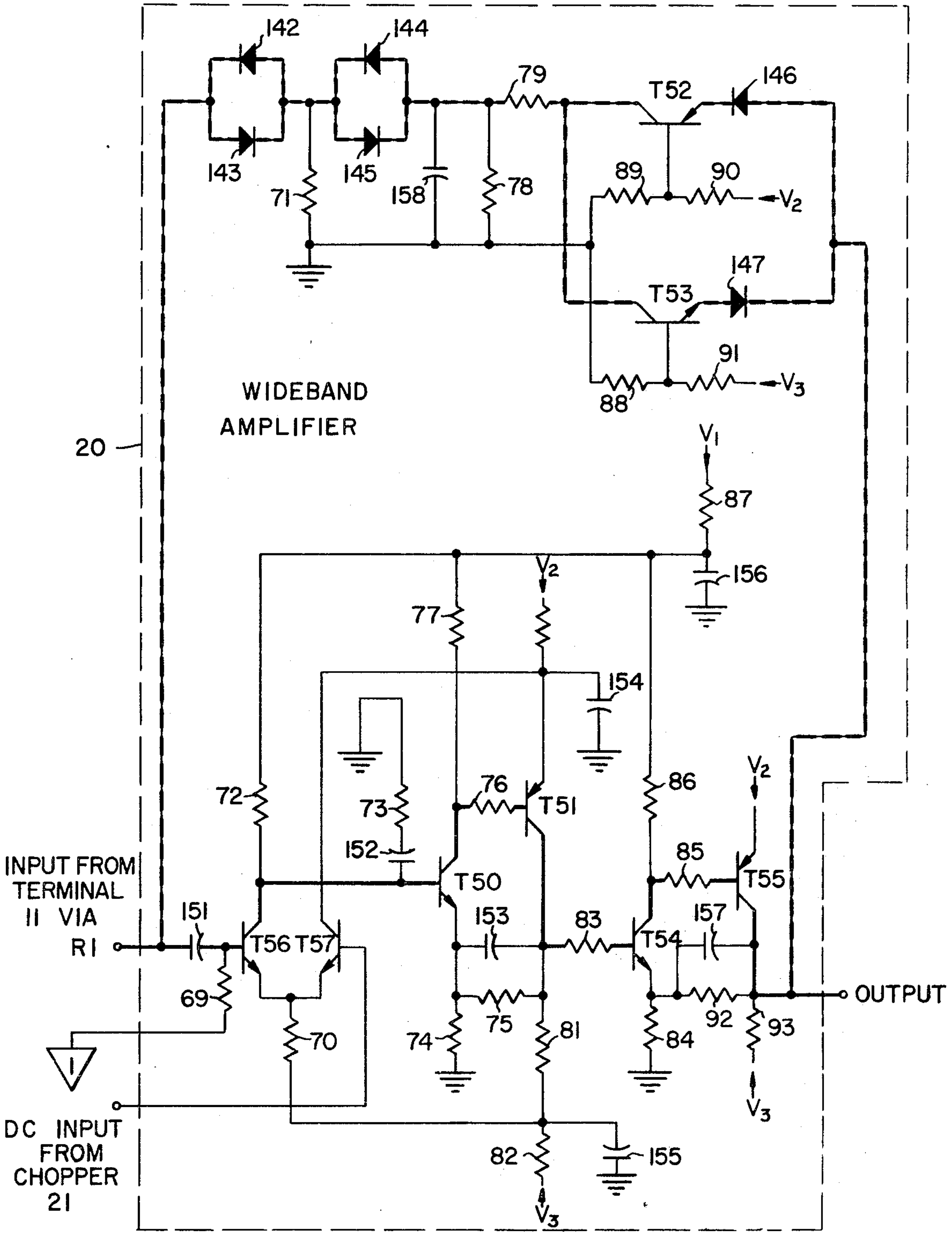
Figure 5:
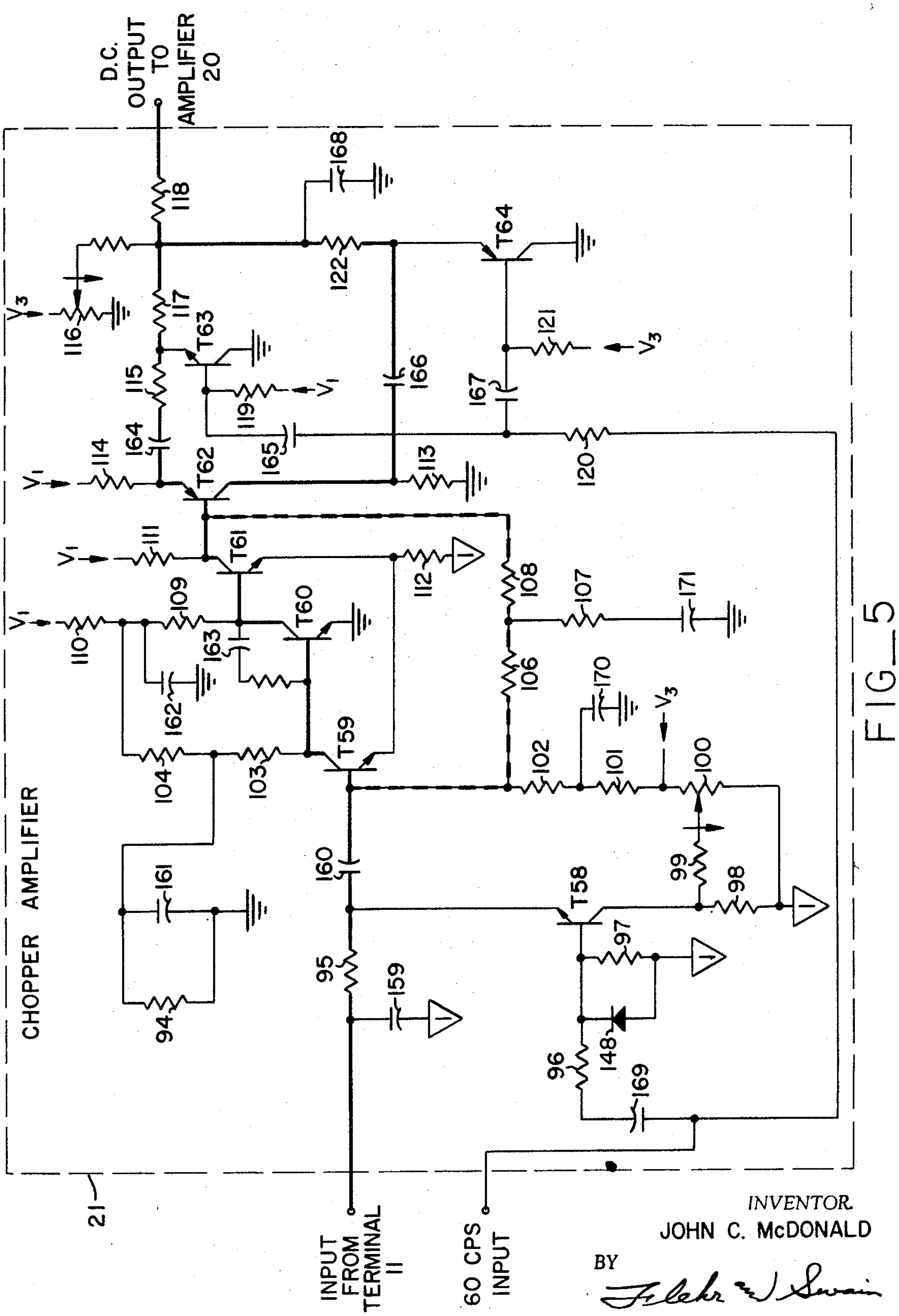
Figure 6:
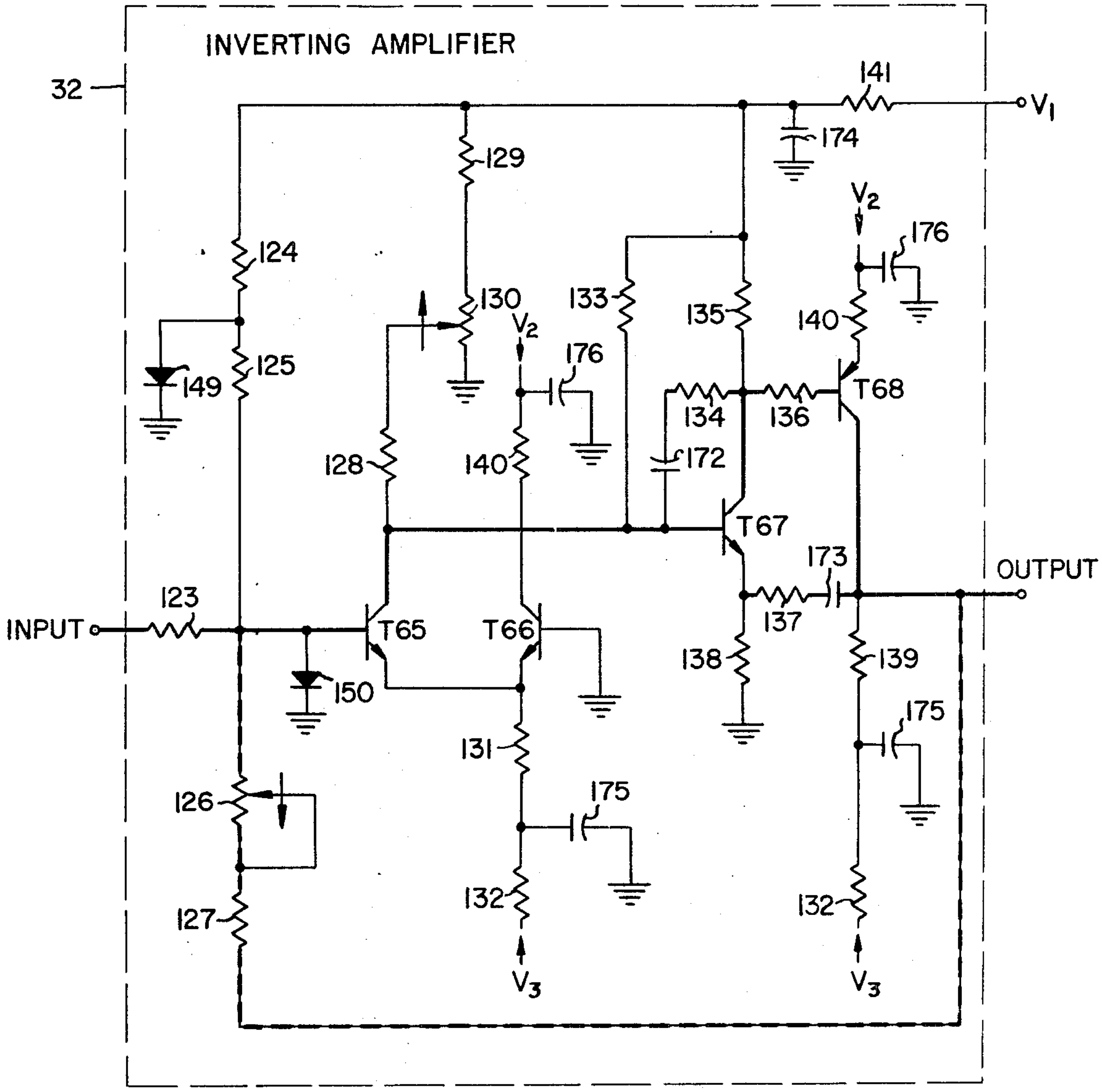

FIGS. 4, 5, and 6 are detailed circuit schematics of portions of FIG. 1.

FIG. 1 illustrates an integrating digital voltmeter incorporating the present invention. An input voltage whose magnitude is to be measured is applied to the terminals 11, and a digital indication of its magnitude is presented by an output indicator 12. The indicator may employ any known type of digital indicators, electrical or mechanical.

The input voltage may be either alternating current (AC) or direct current (DC) of either plus or minus polarity. This voltage is processed in a bipolar amplifier 13 which provides a unidirectional output signal on line 14. A voltage-controlled oscillator 15 is responsive to this single-polarity signal to produce an output signal on line 16 whose frequency is proportional to the magnitude of the signal on line 14. This output frequency is then counted for a prescribed gate time by a gated counter device 17 and the digital information fed to digital indicator 12.

The voltage controlled oscillator 15 may be of the type disclosed in U.S. Pat. No. 3,022,469, entitled "VOLTAGE TO FREQUENCY CONVERTER" issued to G. S. Bahrs, et al., and assigned to the present assignee. The oscillator will be discussed in more detail below in relation to FIG. 2. The bipolar amplifier 13 has the transfer characteristic shown in FIG. 3. The $E_{in}$ axis represents the input voltage at terminals 11 and the $I_0$ axis the current output on line 14. The transfer characteristic provides for a unidirectional output current on line 14 having a positive polarity with either a positive or negative polarity input voltage. Moreover, for alternating current inputs, this transfer characteristic acts as a full-wave rectifier again producing a waveform whose DC average has a positive polarity. Thus, this characteristic makes possible the use of a voltage-controlled oscillator 15 which need be responsive only to inputs of a single polarity.

Referring now more particularly to the constituent parts of bipolar amplifier 13, the voltage whose magnitude is to be measured is applied to terminals 11. Terminal 11*b* is grounded, and terminal 11*a* is coupled through a series resistor R′ to a wide-band amplifier 20 which is responsive to both high-frequency and DC signals and is also coupled to a chopper amplifier 21 through a resistance-capacitance network 22, including components 22*a*, *b* connected in series with resistor 23. This amplifier serves to stabilize the DC operation of amplifier 20 as will be presently described. The chopper amplifier converts low level DC signals from terminals 11 to AC signals, amplifies the AC signals, and converts the amplified AC signals back to a high level DC signal which is applied to amplifier 20 by output lead 24.

A parallel connected diode network 25*a*, *b*, the diodes being connected in a reverse polarity arrangement, is coupled between terminal 11*a* and a common line 1. The function of the network is to provide overload protection to amplifier 13 when excessively large voltages are applied at terminals 11.

Amplifier 20 includes two feedback paths 27 and 28 coupled between the output and the input through a series connected variable resistor 29. The feedback serves to establish the gain at amplifier 13 and provide switching between lines 30 and 31, depending on the polarity of the input signal. Feedback path 27 includes series connected resistor 27*a* and diode rectifier 27*b*, and path 28 similarly includes a resistor 28*a* and a series connected diode 28*b* which is connected in an opposite sense as compared to diode 27*b*.

In accordance with the invention, feedback paths 27 and 28 are also positive and negative polarity outputs. An output of one polarity is produced on conductor 30 which is connected between the resistor 27*a* and diode 27*b*, and an output of the opposite polarity on line 31 which is similarly connected between the resistor 28*a* and diode 28*b*. Conductor 31 is coupled to line 14 feeding oscillator 15 through a series connected inverter 32, a resistor 33, and a switch 35. Output conductor 30 is coupled to output line 14 through a resistor 34 and switch 35.

Inverter 32 includes an inverter amplifier 32*a* which has a parallel connected feedback resistor 32*b* and a series connected input resistor 32*c*. It functions to invert the polarity of all voltages appearing on conductor 31 without changing their amplitude. Thus, the output of wide band amplifier 20, when rectified by diodes 27*b* and 28*b*, inverted by inverter 32, and summed by summing resistors 33 and 36 and fed to line 14, is a voltage wave having a shape determined by the transfer characteristic shown in FIG. 3.

When, for example, an AC voltage is applied to terminals 11*a*, *b*, the negative half-cycle of the input (amplifier 20 has a gain of −A) is present on conductor 30 and the positive half-cycle of the input on conductor 31, which, when inverted and summed, produces a positive full wave rectified voltage on line 14. The instantaneous voltage is sensed by voltage-controlled oscillator 15 to in turn produce a frequency related to this magnitude. On the other hand, a DC input voltage appears either on conductor 30 or 31, depending on its polarity, and no summing action takes place. Indicator 12 displays a number proportional to the integral of the sum of the currents through resistors 33 and 34 during the gate time interval established by counter 17.

Switch 35 is a means to directly read out the average value of AC input signals. The average value is then calibrated to give the root mean square value of sinusoidal input signals. The switch includes two switching positions indicated as positions A and B. In switch position A, switching arms 36 and 37 directly couple the signals on conductors 30 and 31 through amplifier 32 to line 14.

When it is desired to have indicator 12 directly read out root mean square values of AC voltage, the switch is moved to position B where switch arm 36 contacts a grounded terminal and switch arm 37 is series connected to a T-type filter circuit which also includes a potentiometer 42. The filter is coupled to conductor 31 after inverter 32 and includes series connected resistances 40 and 41, series connected potentiometer 42, and a grounded capacitor 43. In operation, when a sinusoidally varying wave is placed on input terminals 11, only one half cycle of this wave will appear on conductor 31, and after being passed through the filter 4–43, the voltage controlled oscillator 15 would normally sense the filtered average value for a half-wave rectified sine wave is 0.45 times its root mean square value. However, by adjustment of potentiometer 42, indicator 12 will directly read out the root mean square value of the wave.

Voltage controlled oscillator 15 is shown in greater detail in block diagram in FIG. 2 where the input signal is applied to line 14, and charges the integrating capacitor $C_1$. As will become presently apparent, integrating capacitor $C_I$ operates with substantially zero volts across it so that the current flowing into the capacitor from the source is determined by the sum of the values of the currents flowing through switch terminals 36 and 37. The charging current $i_{in}$ charges the capacitor and varies the voltage at node 45 connected to the input of a high-gain DC amplifier 46 which presents a high impedance to the capacitor $C_I$. Amplifier 46 amplifies the voltage appearing on capacitor $C_I$ and feeds it to a multivibrator 47. The multivibrator develops a control pulse of approximate period T whenever the applied voltage reaches a predetermined level, for example, zero volts. If the voltage is at or above zero volts, the multivibrator continuously puts out pulses of period T at a frequency which is dependent on the magnitude level of the applied voltage. A standard charge dispenser 48 is coupled to multivibrator 47 and provides a pulse having a standard charge $Q_s$ each time a pulse is applied from the multivibrator. This standard charge is drawn from the capacitor $C_I$ and serves to gain lower the voltage at node 45.

Thus, in operation it can be seen that the overall oscillator circuit operates at such a frequency as to maintain the voltage at node 45 across integrating capacitor $C_I$ very near zero. Moreover, the greater the magnitude of the input current, the greater number of standard charges which must be dispensed by standard charge dispenser 48, and thus the higher the frequency of multivibrator 47. Since the frequency of the multivibrator is directly proportional to the magnitude of the input voltage, the device serves as an effective voltage controlled oscillator. The output of the oscillator is illustrated as coming from multivibrator 47 which is fed to the counter 17 to be processed as explained above.

The above voltage-controlled oscillator circuit 15 may be identical to that disclosed in the above-mentioned Bahrs patent.

FIGS. 4, 5, and 6 show in greater detail amplifier 20, chopper amplifier 21, and the inverter 32. In these three figures, the solid heavy line indicates the signal path, and the heavy dashed lines, feedback paths. Common line 1 is also indicated as shown in FIG. 1. In one particular example, the circuit components and voltage have the following values and type designations:

| | |
|---|---|
| VOLTAGES | |
| $V_1$ | +45 volts |
| $V_2$ | +20 volts |
| $V_3$ | −20 volts |
| TRANSISTORS | |
| 50,54,56,57,58,59, 60,61,65,66,67 | 2N2925 |
| 51, 68 | 2N3638 |
| 52, 62, 64 | 2N404 |
| 53, 63 | 2N1304 |
| 55 | 2N3134 |
| DIODES | |
| 142, 143, 150 | 1N3605 |
| 144,145,146,147, 148,149 | 1N277 |
| RESISTORS | in ohms |
| 69,97,109,121,131, | 100K |
| 70 | 221K |
| 71 | 3900 |
| 72 | 825K |
| 73,90,91 | 2,700 |
| 74 | 68 |
| 75 | 12K |
| 76,85 | 470 |
| 77,124 | 68K |
| 78 | 680 |
| 79,139 | 5,600 |
| 80,82,83,94,110, 136,141 | 1,000 |
| 81 | 22K |
| 84,140 | 220 |
| 86 | 33K |
| 87,100,115,116,130 | 10K |
| 88,89,113,114 | 6,800 |
| 92 | 39K |
| 93 | 1,500 |
| 95 | 46.4K |
| 96 | 330K |
| 98 | 10 |
| 99 | 120K |
| 101,102,103,133 | 1 MEG |
| 104 | 8,200 |
| 105 | 3,300 |
| 106,108 | 1.5 MEG |
| 107,132 | 100 |
| 111 | 150K |
| 112 | 15 |
| 117,118,122 | 47K |
| 119 | 470K |
| 120 | 15K |
| 123 | 11K |
| 125 | Selected |
| 126 | 500 |
| 127 | 10.7K |
| 128 | 332K |
| 129 | 4,700 |
| 134 128 | 560 |
| 135 | 82K |
| 137 | 820 |
| 138 | 33 |
| CAPACITORS | Microfarads |
| 151 | 1.0 |
| 152,170 | 0.47 |
| 153 | 0.05 |
| 154,155,175,176 | 125 |
| 156,161,162,174 | 50 |
| 157 | 220 pf. |
| 158 | 2.2 |
| 159,160 | 0.22 |
| 163 | 470 pf. |
| 164,165,166,167,169 | 5 |
| 168 | 0.1 |
| 171 | 2 |
| 172 | 1500 pf. |
| 173 | 1000 pf. |

The circuit was tested and the performance was as follows:

Accuracy:

DC signals—0.05 percent at full scale

AC signals—0.1 percent at full scale DC to 1 kc./s.

Linearity:

AC signals—1.0 percent of full scale to 10 kc./s.

DC signals—0.02 percent of full scale

Thus, the present invention has provided an improved integrating digital voltmeter which is economical and inexpensive in construction, but yet has the ability to automatically measure both AC and DC voltages.

I claim:

1. A voltage to frequency converter comprising: bipolar amplifier means including two input terminals and an output terminal and responsive to both positive and negative polarities of DC input signals applied to said terminals to produce an amplified unidirectional output voltage of a single polarity on said output terminal having a magnitude directly proportional to the amplitude of said input signals, said bipolar amplifier means including a directly coupled wide-band amplifier having a diode feedback network coupled across its output and input said feedback network providing positive and negative polarity outputs and including an inverter connected to one of such outputs and a summing network coupled to said inverter and to such other output said network producing said unidirectional output which is coupled to said voltage-controlled oscillator; and a voltage controlled oscillator having two input terminals one of said terminals being in common with one of said amplifier input terminals and the other of said terminals being directly coupled to said output terminal, said oscillator being responsive to said unidirectional output and having an output signal whose frequency is proportional to the instantaneous magnitude of such unidirectional input.

2. A converter as in claim 1 where said bipolar amplifier is responsive to both AC and DC input signals together with means for receiving said output signal and providing a digital indication of its frequency.

3. A converter as in claim 2 including a high-freuquency filter having adjustable attenuation means series connected between one output of said bipolar amplifier means and said voltage-controlled oscillator to cause said digital indication to be the root mean square value of said input signal.

4. A converter as in claim 1 where said bipolar amplifier includes means including a chopper amplifier coupled to said wide-band amplifier for stabilizing the DC characteristics of said bipolar amplifier said chopper amplifier converting said DC input signals to AC signals, reconverting said amplified AC signals to higher level DC signals relative to said DC input signals, and coupling such high level DC signals to said wide band amplifier.

* * * * *